(12) United States Patent
Warner (10) Patent No.: US 6,536,408 B1
(45) Date of Patent: Mar. 25, 2003

(54) ENGINE BRAKE CONTROL INTEGRATION WITH VEHICLE SERVICE BRAKES

(75) Inventor: Oliver A. Warner, Brighton, MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 09/974,086

(22) Filed: Oct. 9, 2001

(51) Int. Cl.$^7$ .................................................. F02D 9/06
(52) U.S. Cl. ........................ 123/323; 180/179; 303/142
(58) Field of Search ............................ 123/331, 320, 123/321, 322, 323, 324, 319; 180/170–174, 178, 179; 701/70; 303/125, 129

(56) References Cited

U.S. PATENT DOCUMENTS

| | | | | |
|---|---|---|---|---|
| 3,786,792 A | * | 1/1974 | Pelizzoni et al. | 123/321 |
| 4,106,584 A | * | 8/1978 | Matsubara | 180/177 |
| 4,664,070 A | * | 5/1987 | Meistrick et al. | 123/21 |
| 4,987,869 A | * | 1/1991 | Hilburger | 123/323 |
| 5,121,723 A | * | 6/1992 | Stepper et al. | 123/322 |
| 5,193,657 A | * | 3/1993 | Iizuka | 477/186 |
| 5,255,650 A | | 10/1993 | Faletti et al. | |
| 5,540,201 A | * | 7/1996 | Feucht et al. | 123/322 |
| 5,619,963 A | * | 4/1997 | Faletti et al. | 123/321 |
| 5,718,199 A | | 2/1998 | Hu et al. | |
| 5,733,219 A | | 3/1998 | Rettig | |
| 5,865,154 A | | 2/1999 | Williams et al. | |
| 6,148,793 A | * | 11/2000 | Faletti et al. | 123/322 |

* cited by examiner

Primary Examiner—Christopher P. Schwartz
Assistant Examiner—Devon Kramer
(74) Attorney, Agent, or Firm—Brooks & Kushman P.C.

(57) ABSTRACT

An engine brake control system that is integrated with service brakes for a diesel engine powered vehicle. Three manually selectable modes of operation include an operation with the engine brake control system disabled, an operation with engine braking activated by a zero throttle application and engine braking power level determined by manually actuated dashboard switches or the like, and an operation with engine braking activated by a brake pedal and engine brake power level being proportional to brake pedal displacement and limited by the manually actuated dash-mounted switches or the like.

13 Claims, 2 Drawing Sheets

Fig. 1

Fig. 2

ENGINE BRAKE CONTROL INTEGRATION WITH VEHICLE SERVICE BRAKES

BACKGROUND OF THE INVENTION

1. Field of the Invention

The present invention generally relates to braking systems on diesel powered vehicles that use engine brake systems in addition to vehicle service brakes and more particularly relates to control integration of the former with the latter.

2. Background Art

The heavy-duty diesel engine of a modern highway tractor-trailer commonly includes an engine brake system that is a compression release engine braking system. This supplements service brakes when the tractor-trailer is being operated on declining road surfaces in hilly and mountainous areas. The system manipulates exhaust valves to release air compressed during a compression stroke of one or more engine cylinders to the exhaust system while fuel input to the engine is off. This eliminates the normal expansion within the cylinder and causes the engine to act as an air compressor that is driven by the tractor's rear drive wheels.

Typically, a vehicle driver uses his throttle to activate the engine brake. By removing foot pressure from the throttle pedal after reaching the crest of a hill, the engine brake system automatically activates to retard the downhill speed of the vehicle. This extends service brake life while benefitting engine operation and minimizing tire problems. The system is also activated to limit vehicle speed while it is operating under cruise control to assist in clutchless transmission gear shifting and to retard the vehicle without service brake application.

A dash-mounted, multiposition switch provides means for controlling the amount of braking power desired. For a six-cylinder engine with a compression release braking system, such a switch typically selects two, four or six cylinders to provide low, medium and high braking power respectively. More accurately, a low, medium, or high brake power curve is being selected since engine brake power is proportional to engine speed along each of these curves. The incremental control of braking power is necessary for driver control of vehicle deceleration or for limiting brake power based on traction conditions. This switch also provides means for disabling the engine brake system, for example, while driving an unloaded vehicle under poor traction conditions or where there are noise restrictions. Furthermore, anti-lock brake systems disable the engine brake under severe braking situations. The engine brake acts only on the rear drive wheels of the tractor and may affect vehicle-handling characteristics under this braking condition.

The foregoing describes an engine brake system that has found primary application on diesel-powered highway tractor-trailers while they are being driven in mountainous areas, where there are downhill sections of road. Usage of the system during urban driving situations depends on driver habits and traffic density. In heavy traffic, the current system encourages the driver to follow traffic closely since he can use his throttle foot for both acceleration and moderate deceleration. This eliminates the need for moving his foot between the throttle and brake pedals. In a vehicle coast situation, however, fuel economy is minimized since the driver fuels the engine above idle to keep the engine brake deactivated. Engine brake systems can be integrated with the service brakes by use of a cruise control brake switch. This activates the engine brake system upon application of the brake pedal. However, braking power is not proportional to the brake pedal application since the dash-mounted switch sets the power level. If the dash-mounted switch is set too high, abrupt braking occurs.

The present invention provides a new mode of engine brake control that minimizes service brake wear and maximizes fuel economy during vehicle coasting by integrating the engine brake system with the service brakes. In this mode, the engine brake system is the first source of vehicle braking power, is initiated by brake pedal application only, gives engine brake power proportional to brake pedal motion, and then supplements the vehicle service brakes until disengagement for conditions mentioned earlier.

SUMMARY OF THE INVENTION

The present invention includes an engine brake control system that is integrated with the vehicle service brakes for use with a diesel engine having a plurality of cylinders. The vehicle has the following minimum controls: a throttle pedal, a clutch pedal and a brake pedal. The system includes an engine brake power selector that is settable to select one of a plurality of levels of engine brake power. It also includes an engine brake mode selector that is settable for the following modes of engine brake and service brake operation: 1) The engine brake control system is disabled. 2) Zero throttle activates the engine brake control system and engine brake power is determined by the engine brake power selector setting. 3) The brake pedal activates the engine brake control system. as well as the service brakes, and engine brake power is determined by brake pedal position and limited by the engine brake power selector setting.

The system also includes a brake pedal position slide switch having a pedal-actuated common contact wiper in continuous contact with a base contact. As the brake pedal is displaced, the contact wiper is displaced to engage and/or disengage additional slide contacts to close or open combinations of electrical circuits that cause various engine brake power levels proportionate to pedal travel.

An engine computer having a plurality of inputs, outputs, and control algorithms is needed for proper engine operation in both unfueled brake and fueled power mode. Electrical inputs are required from the engine brake mode selector, engine brake power selector, and the brake pedal position slide switch. Also needed are electrical inputs from other sensors or switches typical for control of compression brake mechanisms and not limited to: a throttle position sensor, a clutch pedal position switch, and an engine speed sensor. The engine brake must be disabled for proper engine operation whenever the throttle is not zero, the clutch is disengaged, or the engine speed is at idle.

The intent of the first embodiment of this invention is to use existing inputs, outputs, and algorithms for engine brake and power control without modification. The conventional dash-mounted switch is replaced by the engine brake mode selector and the engine brake power selector. The brake pedal position slide switch is added. The second embodiment requires changes to the engine computer input configuration and minor logic changes that provide functional and system integration advantages.

BRIEF DESCRIPTION OF THE DRAWINGS

A more complete appreciation of the invention and many of the attendant advantages thereof may be readily obtained by reference to the following detailed description when considered with the accompanying drawings in which like reference characters indicate corresponding parts in all the views, wherein.

DETAILED DESCRIPTION OF THE PREFERRED EMBODIMENTS

Figure 1:
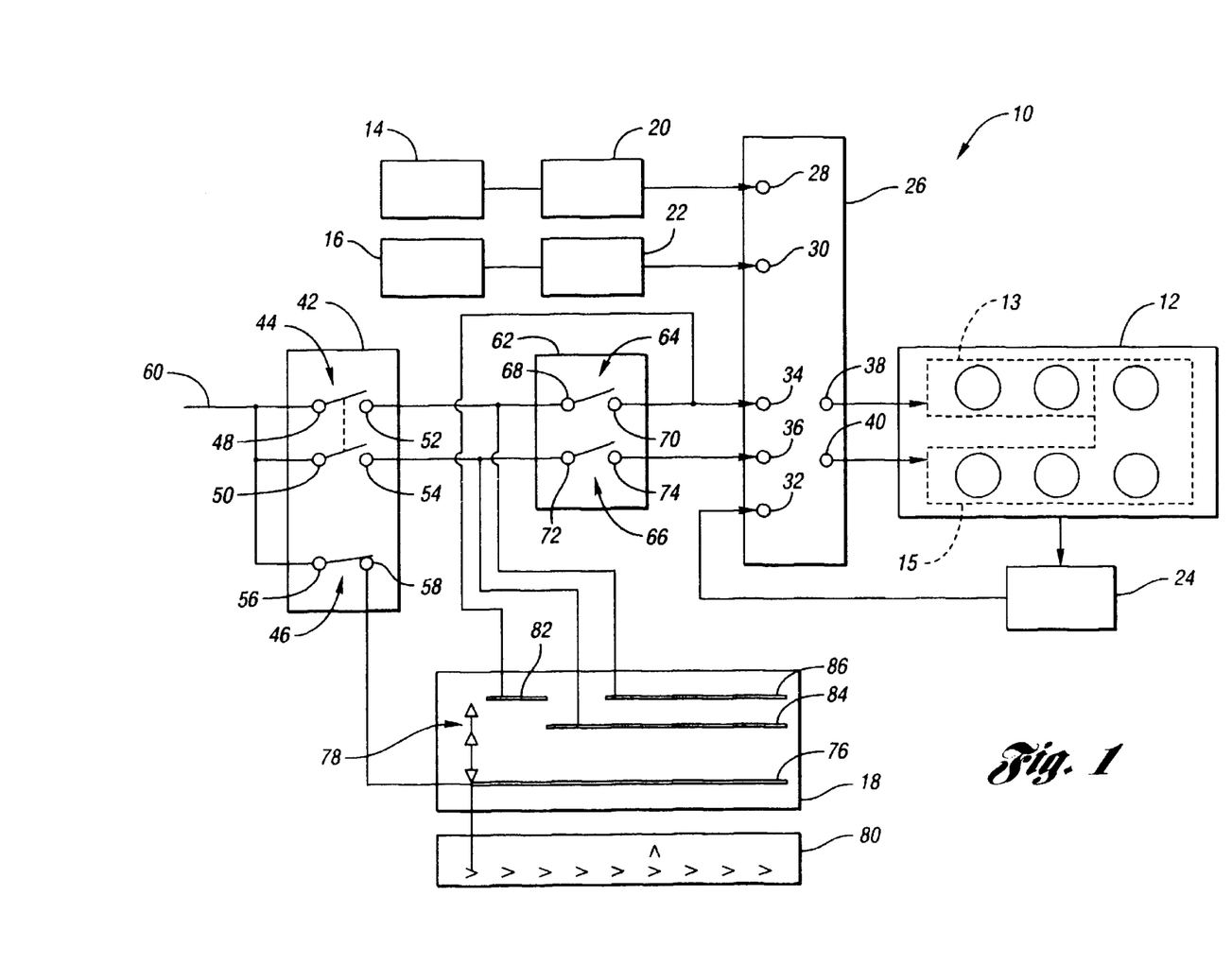
FIG. 1 is a schematic diagram of a first embodiment of an engine brake control system of the present invention.

FIG. 1 of the drawings is a schematic diagram that represents a first embodiment of the engine brake control system, generally indicated by the reference numeral 10, that is integrated with the vehicle service brakes of the present invention. The system 10 has been designed for use with a diesel engine, having a plurality of cylinders and being represented by a symbolic block 12, of a vehicle (not shown). The system 10 includes a throttle pedal, represented by a symbolic block 14; a clutch pedal, represented by a symbolic block 16; and a brake pedal, represented by a symbolic block 80.

The engines 12 and 112 in the first and second embodiments of the present invention depict a six-cylinder engine with compression brake mechanisms 13 and 15, and 113 and 115, represented respectively by dashed lines isolating groups of two and of four cylinders respectively. The engine brake control systems 10 and 110 of the present invention, shown respectively in FIGS. 1 and 2, initiate engine braking by electrically activating a compression brake mechanism 13 or 15, or 113 or 115, for two or four cylinders to provide respectively low or medium brake power. High brake power is achieved by electrically activating both the compression brake mechanisms 13 and 15, or 113 and 115. It is to be understood by those skilled in the art that the engine brake control systems 10 and 110 of the present invention can be used with diesel engines having a greater or lesser number of cylinders than six and that the brake power levels are not limited to three. It is also to be understood that each level of engine brake power selected can be accomplished in a variety of ways depending on engine brake and turbocharger mechanization and is not limited to compression braking mechanisms alone. It is to be further understood that, although the compression brake mechanisms 13 and 15, and 113 and 115, and associated cylinders of engines 12 and 112 have been grouped by dashed lines into a set of two cylinders and a set of four cylinders to facilitate a description thereof, this arrangement is not necessarily meant to represent the only disposition of the compression brake mechanisms and cylinders.

Proper engine operation requires at least the following typical sensors or switches for the engine brake control system 10. A throttle position sensor, represented by a symbolic block 20, is responsive to the position of the throttle pedal 14 and generates a throttle position signal representative thereof. A clutch pedal position switch, represented by a symbolic block 22, is responsive to the position of the clutch pedal 16 and generates a clutch position signal representative of the engagement and disengagement of the clutch. An engine speed sensor, represented by a symbolic block 24, is responsive to the speed of the engine and generates an engine speed signal representative thereof.

The system 10 includes an engine computer 26 having at least input terminals 28, 30, 32, 34 and 36 and output terminals 38 and 40. The throttle position sensor 20 is electrically connected to the engine computer input terminal 28. Brake control logic of the computer 26 is such that, upon receiving a throttle position signal indicating the throttle pedal 14 has been displaced from its zero fuel position, the engine computer 26 disables operation of the engine brake control system 10. The clutch pedal position switch 22 is electrically connected to the engine computer input terminal 30. Upon receiving a clutch pedal position signal indicating the clutch pedal 16 has been displaced, the engine computer 26 disables the engine brake control system 10. The engine speed sensor 24 is electrically connected to the engine computer input terminal 32. Upon receiving an engine speed signal indicating the engine 12 is idling, the engine computer 26 disables the engine brake control system 10.

The foregoing are the typical, minimum external inputs that can cause engine brake disablement of the engine 12 by the engine computer 26 and can occur any time the engine brake is active, regardless of the operating mode of the engine brake control system 10. An input signal communicated to the engine computer input terminal 34 from the output terminal 70 of the low-power switch 64 is the means by which the driver indicates his selection of low engine brake power and his desire to limit engine brake power to a low level under control of the brake control logic of the engine computer 26. The engine computer output terminal 38 is electrically connected to the low-power engine brake mechanism 13 on the engine 12. Similarly, an input signal communicated to the engine computer input terminal 36 from the output terminal 74 of the medium-power switch 66 is the means by which the driver indicates his selection of medium engine brake power and his desire to limit engine brake power to a medium level under control of the brake control logic of the engine computer 26. The engine computer output terminal 40 is electrically connected to the medium-power engine brake mechanism 15 on the engine 12. Input signals communicated simultaneously to both the engine computer input terminals 34 and 36 from the output terminals 70 and 74 of the respective low-power and medium-power switches 64 and 66 are the means by which the driver indicates his selection of high engine brake power under control of the brake control logic of the engine computer 26.

The engine brake control system 10 of the present invention has three basic modes of operation. It can be operated with engine braking disabled. It can be operated with engine braking activated by zero throttle application and power level determined by the manually actuated dashboard switches or the like. Finally, it can be operated with engine braking activated by the brake pedal and engine brake power level proportional to pedal displacement and limited by the manually actuated dash-mounted switches or the like. At some point in the brake pedal displacement, vehicle service brakes are activated and further displacement causes an increase in service brake power proportional to brake pedal displacement.

Mode selection is accomplished using an engine brake mode selector 42. The latter includes a double-pole, single-throw (DPST) electric switch, generally indicated by the reference numeral 44 and referred to as an engine brake switch 44, and by a single-pole, single-throw (SPST) electric switch, generally indicated by the reference numeral 46 and referred to as a brake pedal switch 46. The engine brake mode selector 42 has three positions: an off position resulting in both switches being open, a throttle-activated position resulting in switch 44 being closed and switch 46 being open, a brake-pedal-activated position resulting in switch 44 being open and switch 46 being closed. It is to be understood by those skilled in the art that an apparatus having the equivalent electrical function for the two switches 44 and 46 is also applicable.

The engine brake switch 44 has a first input terminal 48 and a second input terminal 50 and respective first and second output terminals 52 and 54. The brake pedal switch 46 has an input terminal 56 and an output terminal 58. The three input terminals 48, 50 and 56 are electrically connected to a source (not shown) of electric energy via an electric conductor 60.

The representative system 10 shown has three power levels of engine braking: low, medium and high. Selection of a desired level is accomplished using an engine brake power selector 62. The latter includes a pair of single-pole, single-throw switches including a low-power switch, generally indicated by the reference numeral 64, and a medium-power switch, generally indicated by the reference numeral 66. These switches 64 and 66 can be operated to cause only three states of the engine brake power selector 62: low, caused by closed switch 64 and open switch 66; medium, caused by open switch 64 and closed switch 66; and high, caused by both switches 64 and 66 being closed. It is to be understood by those skilled in the art that an apparatus having the equivalent electrical function for the two switches 64 and 66 is also applicable.

The low-power switch 64 of the engine brake power selector 62 has an input terminal 68 and an output terminal 70. The medium-power switch 66 has an input terminal 72 and an output terminal 74. The respective input terminals 68 and 72 of the low-power switch 64 and the medium-power switch 66 are electrically connected to the respective output terminals 52 and 54 of the engine brake switch 44 of the engine brake mode selector 42. The respective output terminals 70 and 74 of the low-power switch 64 and the medium-power switch 66 are electrically connected to the respective engine computer input terminals 34 and 36.

The system 10 also has a brake pedal position slide switch 18, which includes a base slide contact 76. It also has a contact wiper, generally indicated by the reference numeral 78, responsively connected to a brake pedal, generally represented by a symbolic block 80. The base slide contact 76 of the brake pedal position slide switch 18 is electrically connected to the output terminal 58 of brake pedal switch 46 of the engine brake mode selector 42. When brake pedal switch 46 has been placed in a closed position, electric energy is supplied to the base slide contact 76 of the brake pedal position slide switch 18. The slide switch 18 also includes a first low-power slide contact 82, a medium-power slide contact 84 and a second low-power slide contact 86. The first low-power slide contact 82 is electrically connected to the engine computer input terminal 34. The medium-power slide contact 84 is electrically connected to the input terminal 72 of the medium-power power switch 66. The second low-power slide contact 86 is electrically connected to the input terminal 68 of the low-power switch 64.

In operation, when the engine brake is to be disabled, the engine brake mode selector 42 is placed in its off position. This sets the engine brake switch 44 and the brake pedal switch 46 in an open position. No electric energy is applied to the engine computer input terminals 34 or 36, and the engine computer 26 never activates the engine brake control system 10.

When the engine brake is to be throttle activated and not responsive to brake pedal position, the engine brake mode selector 42 is placed in the throttle activated position and this sets the engine brake switch 44 in a closed position and brake pedal switch 46 in an open position. Electric energy is applied to the inputs 68 and 72 of the respective low-power and medium-power switches 64 and 66. If low engine brake power is desired, then the engine brake power selector 62 is placed in the low position and this sets the low-power switch 64 in a closed position and the medium-power switch 66 in an open position. This connects electric energy to the engine computer input terminal 34. The engine computer 26 then responds to any zero throttle input by sourcing electrical energy from terminal 38 to the low-power engine brake mechanism 13. This activates compression braking on two cylinders. When medium engine brake power is desired, the engine brake power selector 62 is placed in the medium position and this sets only the medium-power switch 66 in a closed position and the low-power switch 64 in an open position. This connects electric energy to the engine computer input terminal 36. The engine computer 26 then responds to any zero throttle input by sourcing electrical energy from engine computer output terminal 40 to the medium-power engine brake mechanism 15. This activates compression braking on four cylinders. If high engine brake power is desired, the engine brake power selector 62 is placed in the high position and this sets both the low-power and medium-power switches 64 and 66 in a closed position. This connects electric energy respectively to both the engine computer input terminals 34 and 36. The engine computer 26 responds to any zero throttle input by means of both engine computer output terminals 38 and 40. This activates compression braking on all six cylinders.

If the engine brake control system 10 is to be operated with the service brakes, both brakes are to be responsive to brake pedal position. This is accomplished by placing the engine brake mode selector 42 in brake pedal activated position and this sets the brake pedal switch 46 in a closed position and the engine brake switch 44 in an open position. Operation of the brake pedal position sensor 18 is as follows:

When the brake pedal is pressed, the contact wiper 78 responsively connected thereto is displaced in the direction indicated by the small, rightward-pointing arrowheads (>>>) within the symbolic block 80. The contact wiper 78 is in constant electric contact with the base slide contact 76 as the contact wiper 78 is advanced in response to movement of the brake pedal.

As the contact wiper 78 advances from its initial, illustrated position, it makes additional contact with the first low-power slide contact 82. Electric energy is then communicated to the engine computer input terminal 34, and the engine computer 26 initiates compression braking on two cylinders by means of engine computer output terminal 38.

If the contact wiper 78 continues to advance, it breaks contact with the first low-power slide contact 82 and makes contact with the medium-power slide contact 84. If the engine brake power selector 62 is in the low position, there is no source of electrical energy to the engine computer input terminal 34 by means of the low-power switch 64 or the direct connection with the low-power slide contact 82. The engine computer 26 then disables electric energy from the engine computer output terminal 38 to the low-power engine brake mechanism 13, and low engine brake power ceases. This results in an undesirable but tolerable situation since the engine brake power is very small and power cessation for this small portion of the brake pedal travel should be unnoticeable, and the second embodiment seeks to correct this shortcoming. However, if the engine brake power selector 62 is placed in the medium or high position, the medium-power switch 66 is closed and the medium-power slide contact 84 communicates electric energy to the engine computer input terminal 36 by means of the medium-power switch 66; and the engine computer 26 initiates compression braking on four cylinders by means of the engine computer output terminal 40.

If the contact wiper 78 continues to advance, it makes additional contact with both the second low-power slide contact 86 and the medium-power slide contact 84 and communicates electric energy to the respective input terminals 68 and 72 of the low-power switch 64 and of the medium-power switch 66. If the engine brake power selector 62 is placed in the low position, the low-power switch 64 is closed and the medium-power switch 66 is open; and the former communicates electric energy to the engine computer input terminal 34. The engine computer 26 initiates compression braking on two cylinders by means of engine computer output terminal 38. If the engine brake power selector switch 62 is placed in the medium position, the low-power switch 64 is open and the medium-power switch 66 is closed; and the latter communicates electric energy to the engine computer input terminal 36. The engine computer 26 initiates compression braking on four cylinders by means of engine computer output terminal 40. If the engine brake power selector 62 is set to the high position, the low-power switch 64 and the medium-power switch 66 are both closed; and they respectively communicate electric energy to the engine computer input terminals 34 and 36. The engine computer 26 initiates compression braking on all six cylinders by means of the engine computer output terminals 38 and 40.

The contact wiper 78 maintains contact with the second low-power slide contact 86 and the medium-power slide contact 84 during any additional advancement of the brake pedal. An upward arrow (A) within the symbolic block 80 represents a point within the range of brake pedal travel at which service brakes are to be first applied. Beyond this point, both the engine brake and the service brakes supply vehicle braking; and further brake pedal motion applies more service brake power while the engine brake power remains at the high level and varies with engine speed until disablement. It is to be understood by those skilled in the art that, since vehicle braking power is a function of more than one factor, a specific level of braking power is not directly related to any specific brake pedal position. It is also to be understood that the point of first application of service brake power may be adjusted as well as the brake pedal duration of each engine brake power level for driver braking feel or vehicle braking performance.

Table I illustrates the conditions of the engine brake and the service brake for the various combinations of the engine brake mode selector 42, the engine brake power selector 62 and the brake pedal position slide switch 18.

TABLE I

Switch State and Braking Power (First Embodiment)

| Engine Brake Mode Selector 42 | Engine Brake Switch 44 | Brake Pedal Switch 46 | Engine Brake Power Selector 62 | Low Power Switch 64 | Medium Power Switch 66 | Brake Pedal Position Slide Switch 18 | Engine Brake Power | Service Brake Power |
|---|---|---|---|---|---|---|---|---|
| OFF | OPEN | OPEN | ANY | ANY | ANY | ANY | NONE | ANY |
| Throttle Activated | Closed | Open | Low | Closed | Open | Any | Low | Any |
| Throttle Activated | Closed | Open | Medium | Open | Closed | Any | Medium | Any |
| Throttle Activated | Closed | Open | High | Closed | Closed | Any | High | Any |
| Brk Pedal Activated | Open | Closed | Low | Closed | Open | Low | Low | None |
| Brk Pedal Activated | Open | Closed | Low | Closed | Open | Medium | None | None |
| Brk Pedal Activated | Open | Closed | Low | Closed | Open | High | Low | Any |
| Brk Pedal Activated | Open | Closed | Medium | Open | Closed | Low | Low | None |
| Brk Pedal Activated | Open | Closed | Medium | Open | Closed | Medium | Medium | None |
| Brk Pedal Activated | Open | Closed | Medium | Open | Closed | High | Medium | Any |
| Brk Pedal Activated | Open | Closed | High | Closed | Closed | Low | Low | None |
| Brk Pedal Activated | Open | Closed | High | Closed | Closed | Medium | Medium | None |
| Brk Pedal Activated | Open | Closed | High | Closed | Closed | High | High | Any |

Figure 2:
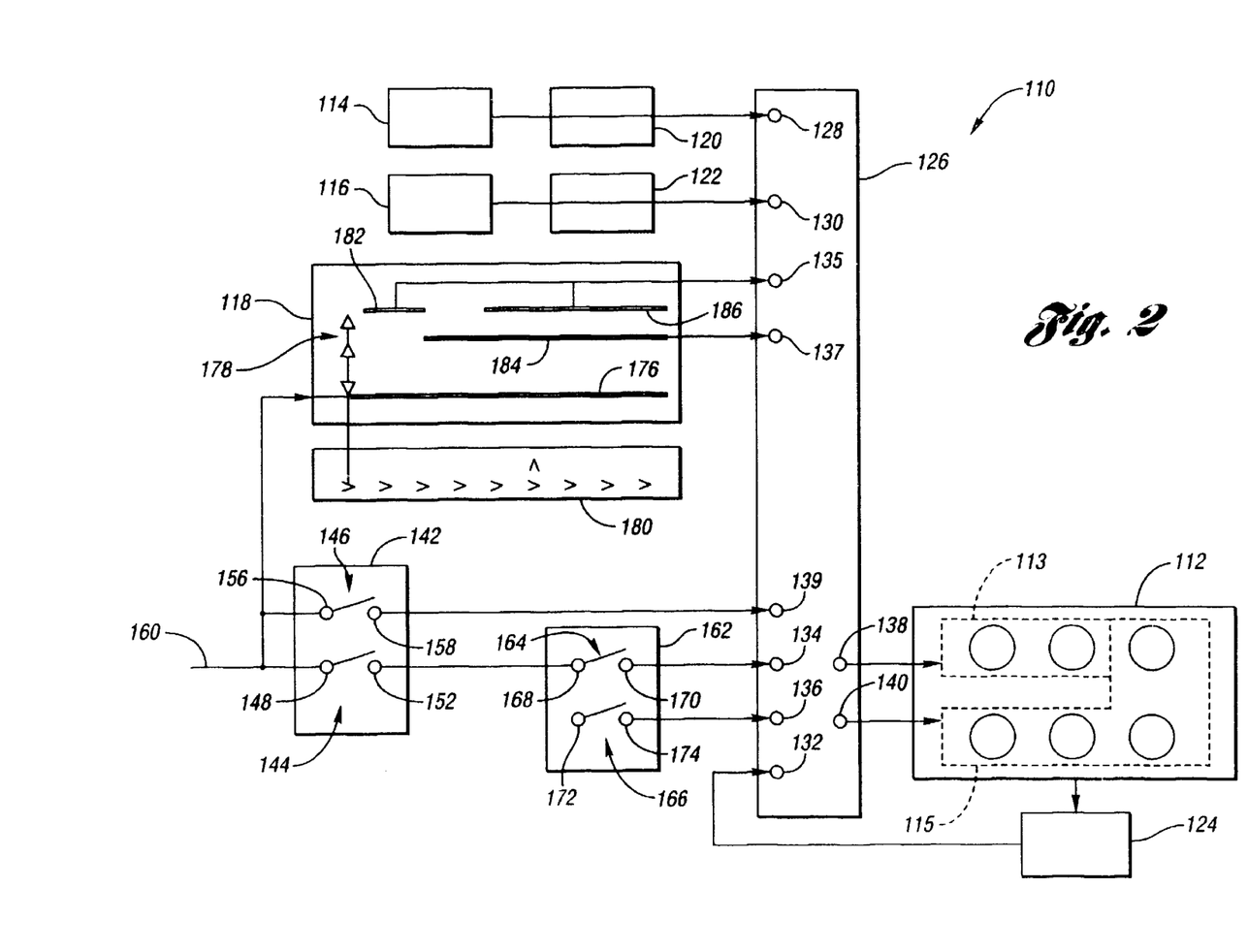
FIG. 2 is a schematic diagram of a second embodiment of the engine brake control system of the present invention.

FIG. 2 of the drawings is a schematic diagram that represents a second embodiment of the engine brake control system, generally indicated by the reference numeral 110, of the present invention that is integrated with the vehicle service brakes. The system 110 has been designed for use with a diesel engine, represented by a symbolic block 112, of a vehicle (not shown). The system 110 includes a throttle pedal, represented by a symbolic block 114; a clutch pedal, represented by a symbolic block 116; and a brake pedal, represented by a symbolic block 180.

Proper engine operation requires at least the following typical sensors or switches for the engine brake control system 110. A throttle position sensor, represented by a symbolic block 120, is responsive to the position of the throttle pedal 114 and generates a throttle position signal representative thereof. A clutch pedal position switch, represented by a symbolic block 122, is responsive to the position of the clutch pedal 116 and generates a clutch position signal representative of the engagement and disengagement of the clutch. An engine speed sensor, represented by a symbolic block 124, is responsive to the engine speed and generates an engine speed signal representative thereof.

The system 110 includes an engine computer 126, having at least input terminals 128, 130, 132, 134, 136, 135, 137 and 139 and output terminals 138 and 140. The throttle position sensor 120 is electrically connected to the engine computer input terminal 128. Computer brake control logic is such that, upon receiving a throttle position signal indicating the throttle pedal 114 has been displaced from its zero fuel position, the engine computer 126 disables operation of the engine brake control system 110. The clutch pedal position switch 122 is electrically connected to the engine computer input terminal 130. Upon receiving a clutch position signal indicating the clutch pedal 116 has been displaced, the engine computer 126 disables the engine brake control system 110. The engine speed sensor 124 is electrically connected to the engine computer input terminal 132. Upon receiving an engine speed signal indicating the engine 112 is idling, the engine computer 126 disables the engine brake control system 110.

The foregoing are the typical, minimum external inputs that can cause engine braking disablement by logical means of the engine computer 126 and can occur any time the engine brake is active, regardless of the operating mode of the engine brake control system 110. An input signal communicated to the engine computer input terminal 134 from the output terminal 170 of the low-power switch 164 is the means by which the driver indicates his selection of low engine brake power and his desire to limit engine brake power to a low level under control of the brake control logic of the engine computer 126. The engine computer output terminal 138 is electrically connected to the low-power engine brake mechanism 113 on the engine 112. Similarly, an input signal communicated to the engine computer input terminal 136 from the output terminal 174 of the medium-power switch 166 is the means by which the driver indicates his selection of medium engine brake power and his desire to limit engine brake power to a medium level under control of the brake control logic of the engine computer 126. The engine computer output terminal 140 is electrically connected to the medium-power engine brake mechanism 115 on the engine 112. Input signals communicated simultaneously to both the engine computer input terminals 134 and 136 from the output terminals 170 and 174 of the respective low-power and medium-power switches 164 and 166 are the means by which the driver indicates his selection of high engine brake power under control of the brake control logic of the engine computer 126. The second embodiment of the engine brake control system 110 adds new logical control of output terminals 138 and 140 by addition of the engine computer input terminal 135 for low brake power requests, engine computer input terminal 137 for medium brake power requests, and engine computer input terminal 139.

The engine brake control system 110 of the present invention has three basic modes of operation. It can be operated with engine braking disabled. It can also be operated with the engine brake activated by zero throttle application and power level determined by the manually actuated dashboard switches or the like. Finally, it can be operated with engine braking activated by the brake pedal and engine brake power level proportional to pedal displacement but limited by the manually actuated dash-mounted switches or the like. At some point in the brake pedal displacement, vehicle service brakes are activated and further displacement causes an increase in applied service brake power proportional to brake pedal displacement.

Mode selection is accomplished using an engine brake mode selector 142. The latter includes a first single-pole, single-throw (SPST) electric switch, generally indicated by the reference numeral 144 and referred to as an engine brake switch, and by a second single-pole, single-throw (SPST) electric switch, generally indicated by the reference numeral 146 and referred to as a brake pedal switch. The engine brake switch 144 has an input terminal 148 and an output terminal 152. The brake pedal switch 146 has an input terminal 156 and an output terminal 158. The two input terminals 148 and 156 are electrically connected to a source (not shown) of electric energy via an electric conductor 160. The output terminal 158 of the brake pedal switch 146 is electrically connected to the engine computer input terminal 139.

The representative system 110 shown has three power levels of engine braking: low, medium and high. Selection of a desired level is accomplished using an engine brake power selector 162. The latter includes a pair of single-pole, single-throw switches including a low-power switch, generally indicated by the reference numeral 164, and a medium-power switch, generally indicated by the reference numeral 166. The switches 164 and 166 can be operated to cause only three states of the engine brake power selector 162: low caused by the switch 164 being closed and the switch 166 being open, medium caused by the switch 164 being open and the switch 166 being closed, and high caused by both the switches 164 and 166 being closed. It is understood by those skilled in the arts that the engine brake power selector 162 and the associated engine computer terminal inputs 134 and 136 could be replaced by a variable potentiometer and a single analog engine computer input. Suitable engine computer logic would then achieve functional equivalency.

The low-power switch 164 of the engine brake power selector 162 has an input terminal 168 and an output terminal 170. The medium-power switch 166 has an input terminal 172 and an output terminal 174. The respective input terminals 168 and 172 of the low-power switch 164 and the medium-power switch 166 are electrically connected to the output terminal 152 of the engine brake switch 144. The respective output terminals 170 and 174 of the low-power switch 164 and the medium-power switch 166 are electrically connected to the respective engine computer input terminals 134 and 136.

The system 110 also has a brake pedal position slide switch 118, which includes a base slide contact 176. It also has a contact wiper, generally indicated by the reference numeral 178, responsively connected to a brake pedal, generally represented by a symbolic block 180. The base slide contact 176 of the brake pedal position slide switch 118 is electrically connected to a source of electric energy (not shown) via an electric conductor 160. The slide switch 118 also includes a first low-power slide contact 182, a medium-power slide contact 184 and a second low-power slide contact 186. The first low-power slide contact 182 is electrically connected to the engine computer input terminal 135. The medium-power slide contact 184 is electrically connected to the engine computer input 137. The second low-power slide contact 186 is also electrically connected to the engine computer input terminal 135.

In operation, when the engine brake is disabled, the engine brake switch 144 is placed in its open position and the position of the brake pedal switch 146 does not matter. No electric energy is applied to the engine computer input terminals 134 or 136, computer logic ignores engine computer input terminals 135, 137 and 139; and the engine computer 126 never activates the engine brake control system 110.

When the engine brake is to be throttle activated and not responsive to brake pedal position, the engine brake switch 144 is placed in a closed position and the brake pedal switch 146 is placed in an open position. Electric energy is applied to the inputs 168 and 172 of the respective low-power and medium-power switches 164 and 166. If low engine brake power is desired, then the engine brake power selector 162 is placed in the low position and this sets the low-power switch 164 in a closed position and the medium-power switch 166 in an open position. This connects electric energy to the engine computer input terminal 134. The engine computer 126 then responds to any zero throttle input by sourcing electrical energy from the terminal 138 to the low-power engine brake mechanism 113. This activates compression braking on two cylinders. When medium engine brake power is desired, the engine brake power selector 162 is placed in the medium position and this sets the medium-power switch 166 in a closed position and the low-power switch 164 in an open position. This connects electric energy to the engine computer input terminal 136. The engine computer 126 then responds to any zero throttle input by sourcing electrical energy from the engine computer output terminal 140 to the medium-power engine brake mechanism 115. This activates compression braking on four cylinders. If high engine brake power is desired, the engine brake power selector 62 is placed in the high position and this sets both the low-power and medium-power switches 164 and 166 in a closed position. This connects electric energy respectively to both engine computer input terminals 134 and 136. The engine computer 126 responds to any zero throttle input by means of both engine computer output terminals 138 and 140. This activates compression braking on all six cylinders.

If the engine brake control system 110 is to be operated with the service brakes, both brakes are to be responsive to brake pedal position. This is accomplished by placing the brake pedal switch 146 in a closed position while the engine brake switch 144 is in a closed position.

If engine brake power is to be limited to its low level, engine brake power selector 162 is set to low and this sets the low-power switch 164 in a closed position and the medium-power switch 166 in a open position. This results in communication of electrical energy from engine brake switch 144 to the engine computer input terminal 134 only. Operation of the brake pedal position sensor 118 is as follows:

When the brake pedal is pressed, the contact wiper 178 responsively connected thereto is displaced in the direction indicated by the small, rightward-facing arrowheads (>>>) within the symbolic block 180. The contact wiper 178 is in constant electrical contact with the base slide contact 176 as the contact wiper 178 is advanced in response to movement of the brake pedal. An upward arrow (A) within the symbolic block 180 represents the point within the range of brake pedal travel at which service brakes are to be first applied. Beyond this point service brake power is proportional to further brake pedal displacement.

As the contact wiper 178 advances from its initial, illustrated position, it makes additional contact with the first low-power slide contact 182. Electric energy is then communicated to the engine computer input terminal 135, and the engine computer 126 responds by initiating compression braking on two cylinders by means of engine computer output terminal 138. If the contact wiper 178 continues to advance, it breaks contact with the first low-power slide contact 182 and makes contact with the medium-power slide contact 184, communicating electric energy to the engine computer terminal 137. Since only the low-power switch 164 is in a closed position, however, the response of the engine computer 126 is limited to continuing compression braking on only two cylinders. If the contact wiper 178 continues to advance, it makes additional contact with the second low-power slide contact 186, communicating electric energy to the engine computer input terminal 135 as well as to the engine computer input terminal 137. Since only the low-power switch 164 is in a closed position, however, the response of the engine computer 126 is limited to continue compression braking on only two cylinders. This second embodiment results in an improvement over the first embodiment in that low engine brake power is achieved throughout the brake pedal travel, without interruption, by the new input configuration and logic for the engine computer 126. It is to be understood by those skilled in the art that another advantage is that the brake pedal position slide switch 118 can replace the cruise control brake switch (not shown). It is also to be understood that the brake pedal position switch 118 and the associated engine computer terminal inputs 135 and 137 could be replaced by a variable potentiometer and a single analog engine computer input. Suitable engine computer logic would then achieve functional equivalency.

If engine brake power is to be limited to its medium level, the engine brake power selector 162 is set to its medium position and this sets the medium-power switch 166 in a closed position and the low-power switch 164 in a open position. This results in communication of electrical energy from the engine brake switch 144 to the engine computer input terminal 136 only. As the contact wiper 178 advances from its initial, illustrated position, it makes additional contact with the first low-power slide contact 182. Electric energy is then communicated to the engine computer input terminal 135, and the engine computer 126 responds by initiating compression braking on two cylinders by means of engine computer output terminal 138. If the contact wiper 178 continues to advance, it breaks contact with the first low-power slide contact 182 and makes contact with the medium-power slide contact 184, communicating electric energy to the input 137 of the engine computer 126. Since the medium-power switch 166 is placed in a closed position, the response of the engine computer 126 is to initiate compression braking on four cylinders by means of the engine computer output terminal 140. If the contact wiper 178 continues to advance, it makes additional contact with the second low-power slide contact 186, communicating electric energy to the engine computer input terminal 135 as well as to the engine computer input terminal 137. Since only the medium-power switch 164 is in a closed position, however, the response of the engine computer 126 is limited to initiating compression braking on only four cylinders.

If engine brake power is to be set to its high level, engine brake power selector 162 is set to its high position and this sets both the low-power switch 164 and the medium-power switch 166 in a closed position. This results in communication of electrical energy from the engine brake switch 144 to both the engine computer input terminals 134 and 136. As the contact wiper 178 advances from its initial, illustrated position, it makes additional contact with the first low-power slide contact 182. Electric energy is then communicated to the engine computer input terminal 135, and the engine computer 126 responds by initiating compression braking on two cylinders by means of the engine computer output terminal 138. If the contact wiper 178 continues to advance, it breaks contact with the first low-power slide contact 182 and makes contact with the medium-power slide contact 184, communicating electric energy to the input 137 of the engine computer 126. The response of the engine computer 126 is to initiate compression braking on four cylinders. If the contact wiper 178 continues to advance, it makes additional contact with the second low-power slide contact 186, communicating electric energy to the engine computer input terminal 135 as well as to the engine computer input terminal 137. The engine computer 126 responds to this input by initiating compression braking on all six cylinders.

Table II illustrates the conditions of the engine brake and the service brake for the various combinations of the engine brake mode selector 142, the engine brake power selector 162 and the brake pedal position slide switch 118.

TABLE II

SWITCH STATE AND BRAKING POWER (SECOND EMBODIMENT)

| Engine Brake Mode Selector 142 | Engine Brake Switch 144 | Brake Pedal Switch 146 | Engine Brake Power Selector 162 | Low Power Switch 164 | Medium Power Switch 166 | Brake Pedal Position Slide Switch 118 | Engine Brake Power | Service Brake Power |
|---|---|---|---|---|---|---|---|---|
| Off | Open | Any | Any | Any | Any | Any | None | Any |
| Throttle Activated | Closed | Open | Low | Closed | Open | Low | Low | Any |
| Throttle Activated | Closed | Open | Medium | Open | Closed | Medium | Medium | Any |
| Throttle Activated | Closed | Open | High | Closed | Closed | High | High | Any |
| Brk Pedal Activated | Closed | Closed | Low | Closed | Open | Low | Low | None |
| Brk Pedal Activated | Closed | Closed | Low | Closed | Open | Medium | Low | None |
| Brk Pedal Activated | Closed | Closed | Low | Closed | Open | High | Low | Any |
| Brk Pedal Activated | Closed | Closed | Medium | Open | Closed | Low | Low | None |
| Brk Pedal Activated | Closed | Closed | Medium | Open | Closed | Medium | Medium | None |
| Brk Pedal Activated | Closed | Closed | Medium | Open | Closed | High | Medium | Any |
| Brk Pedal Activated | Closed | Closed | High | Closed | Closed | Low | Low | None |
| Brk Pedal Activated | Closed | Closed | High | Closed | Closed | Medium | Medium | None |
| Brk Pedal Activated | Closed | Closed | High | Closed | Closed | High | High | Any |

While embodiments of the invention have been illustrated and described, it is not intended that these embodiments illustrate and describe all possible forms of the invention. Rather, the words used in the specification are words of description rather than limitation, and it is to be understood that various changes may be made without departing from the spirit and scope of the invention.

What is claimed is:

1. An engine brake control system that is integrated with the service brakes for use with a diesel engine, having a plurality of cylinders, for a vehicle having a throttle pedal, a clutch pedal and a brake pedal, the system comprising:
   an engine brake power selector that is settable to select one of a plurality of levels of engine brake power;
   an engine brake mode selector that is settable to select a first mode of engine brake control system operation when no engine braking is desired, to select a second mode thereof when engine braking is activated by the throttle pedal only and engine brake power is determined by the engine brake power selector setting, and to select a third mode thereof when combined service braking and engine braking are used and engine brake power is activated and determined by brake pedal displacement but limited by the engine brake power selector setting;
   a brake pedal position sensor responsive to the position of the brake pedal to generate a brake pedal position signal representative thereof; and
   an engine computer having a plurality of inputs and outputs,
   to the computer inputs there being communicated electric energy as a function of the setting of the engine brake mode selector, the setting of the engine brake power selector, and the setting of the brake pedal position sensor switch, the computer determining from the electric energy communicated to the inputs thereof the engine brake mode selected and the level of engine brake power selected, and the computer responding based upon the brake control logic by generating output signals to the computer outputs to direct the initiation of engine brake mechanisms and to provide the level of engine brake power selected.

2. The system as defined in claim 1, wherein the brake pedal position sensor comprises a slide switch having a plurality of slide contacts, including a base slide contact, and a contact wiper, a displacement of the brake pedal causing a displacement of the contact wiper, the contact wiper being in continuous contact with the base slide contact and in contact with a plurality of additional slide contacts according to brake pedal displacement.

3. The system as defined by claim 2, further comprising a throttle position sensor responsive to the position of the throttle pedal to generate a throttle position signal representative thereof, the engine computer determining from the throttle position signal the throttle position and disabling the engine brake anytime the throttle is not at its zero fuel position.

4. The system as defined by claim 3, further comprising a clutch pedal position switch responsive to the position of the clutch pedal to generate a clutch position signal representative thereof, the engine computer determining from the clutch position signal the clutch position and disabling the engine brake anytime the clutch is disengaged.

5. The system as defined by claim 4, further comprising an engine speed sensor responsive to the speed of the engine to generate an engine speed signal representative thereof, the engine computer determining from the engine speed signal the engine speed and disabling the engine brake anytime the engine is operating at idle speed.

6. The system as defined by claim 5, wherein the engine brake mode selector comprises
at least a double-pole, single-throw engine brake switch having at least first and second input and first and second output terminals; and
a single-pole, single-throw brake pedal switch having an input and an output terminal, all the input terminals being electrically connected to a source of electric energy, the switches being configured so that, both switches are open or one is closed while the other is open.

7. The system as defined by claim 6, wherein the engine brake power selector comprises at least two single-pole, single-throw switches, the switches being configured so that both switches are closed or one is closed while the other is open, one of the two switches being a low-power switch closable to select a lowest level of engine brake power and the other of the two switches being a medium-power switch closable to select a medium level thereof, both low-power and medium-power switches being simultaneously closable to select a highest level thereof, the switches each having an input and an output terminal, and the input terminal of the low-power switch and that of the medium-power switch being electrically connected to the respective first and second output terminals of the engine brake switch.

8. The system as defined by claim 7, wherein the plurality of slide contacts of the brake pedal position slide switch comprise, in order of contact by the contact wiper as the latter is advanced by the brake pedal:
at least a first low-power slide contact electrically connected to the output terminal of the low-power switch;
a medium-power slide contact electrically connected to the input terminal of the medium-power switch; and
a second low-power slide contact electrically connected to the input terminal of the low-power switch,
the base slide contact of the brake pedal position slide switch being electrically connected to the brake pedal switch output terminal, at some initial brake pedal displacement the contact wiper making contact with the first low-power slide contact, at some further brake pedal displacement the contact wiper breaking contact with the first low-power slide contact prior to making contact with the medium-power slide contact, at some further brake pedal displacement the contact wiper making contact with the second low-power slide contact, and service brake application beginning at a subsequent point in the brake pedal displacement.

9. The system as defined by claim 8, wherein the plurality of inputs and outputs of the engine computer comprises at least first, second, third, fourth and fifth computer inputs and at least first and second computer outputs, the first computer input being electrically connected to the throttle position sensor, the second computer input being electrically connected to the clutch pedal position switch, the third computer input being electrically connected to the engine speed sensor, the fourth computer input being electrically connected to the output terminal of the low-power switch, the fifth computer input being electrically connected to the output terminal of the medium-power switch, and the output signals responsively generated by the engine computer brake control logic being communicated respectively to the first and second computer outputs.

10. The system as defined by claim 5, wherein the engine brake mode selector comprises:
at least a single-pole, single-throw engine brake switch having at least an input terminal and an output terminal; and
at least a single-pole, single-throw brake pedal switch having at least an input terminal and an output terminal,
the input terminals of both switches being electrically connected to a source of electric energy.

11. The system as defined by claim 10, wherein the engine brake power selector comprises at least two single-pole, single-throw switches, the switches being configured so that both switches are closed or one is closed while the other is open, one of the two switches being a low-power switch closable to select a lowest level of engine brake power and the other of the two switches being a medium-power switch closable to select a medium level thereof, both low-power and medium-power switches being simultaneously closable to select a highest level thereof, the switches each having an input and an output terminal, all the input terminals being electrically connected to the output terminal of the engine brake switch.

12. The system as defined by claim 11, wherein the plurality of slide contacts of the brake pedal position slide switch, in order of contact by the contact wiper as the latter is advanced, comprises:
at least a first low-power slide contact;
a medium-power slide contact; and
a second low-power slide contact,
the first and second low-power slide contacts being electrically connected to each other, at some initial brake pedal displacement the contact wiper making contact with the first low-power slide contact, at some further brake pedal displacement the contact wiper breaking contact with the first low-power slide contact prior to making contact with the medium-power slide contact, at some further brake pedal displacement the contact wiper making contact with the second low-power slide contact, a point in the brake pedal displacement at which service brake application begins.

13. The system as defined by claim 12, wherein the plurality of inputs and outputs of the computer comprises at least first, second, third, fourth, fifth, sixth, seventh and eighth computer inputs and at least first and second computer outputs, the first computer input being electrically connected to the throttle position sensor, the second computer input being electrically connected to the clutch pedal position switch, the third computer input being electrically connected to the engine speed sensor, the fourth computer input being electrically connected to the output terminal of the low-power switch, the fifth computer input being electrically connected to the output terminal of the medium-power switch, the sixth computer input being electrically connected to the first and second low-power slide contacts, the seventh computer input being connected to the medium-power slide contact, the eighth computer input being electrically connected to the output terminal of the brake pedal position slide switch, the output signals responsively generated by the computer brake control logic being communicated to the first and second engine computer outputs, the input configuration and logic for the engine computer thereby providing for interruption-free low engine brake power throughout the travel of the brake pedal.

* * * * *

UNITED STATES PATENT AND TRADEMARK OFFICE
CERTIFICATE OF CORRECTION

PATENT NO. : 6,536,408 B1
DATED : March 25, 2003
INVENTOR(S) : Oliver A. Warner

It is certified that error appears in the above-identified patent and that said Letters Patent is hereby corrected as shown below:

<u>Column 14,</u>
Line 45, delete "switch"

<u>Column 16,</u>
Line 60, delete "position slide"

Signed and Sealed this

Twelfth Day of August, 2003

JAMES E. ROGAN
*Director of the United States Patent and Trademark Office*